US010818961B2

(12) United States Patent
Liu et al.

(10) Patent No.: US 10,818,961 B2
(45) Date of Patent: Oct. 27, 2020

(54) ANODE ELECTRODE SLURRY SUSPENDING AGENT, ANODE ELECTRODE PLATE AND ENERGY STORAGE DEVICE

(71) Applicant: CONTEMPORARY AMPEREX TECHNOLOGY CO., LIMITED, Ninge (DE)

(72) Inventors: Huihui Liu, Ningde (CN); Jirong Li, Ningde (CN); Chao Guo, Ningde (CN); Jialong Wu, Ningde (CN); Kang Wang, Ningde (CN)

(73) Assignee: CONTEMPORARY AMPEREX TECHNOLOGY CO., LIMITED, Ningde, Fujian Province (CN)

( * ) Notice: Subject to any disclaimer, the term of this patent is extended or adjusted under 35 U.S.C. 154(b) by 136 days.

(21) Appl. No.: 15/918,866

(22) Filed: Mar. 12, 2018

(65) Prior Publication Data

US 2018/0287198 A1    Oct. 4, 2018

(30) Foreign Application Priority Data

Mar. 30, 2017    (CN) .......................... 2017 1 0203160

(51) Int. Cl.
*H01M 10/0525* (2010.01)
*H01M 4/62* (2006.01)
(Continued)

(52) U.S. Cl.
CPC .......... *H01M 10/0525* (2013.01); *C08L 9/02* (2013.01); *C08L 33/06* (2013.01); *C08L 33/24* (2013.01);
(Continued)

(58) Field of Classification Search
None
See application file for complete search history.

(56) References Cited

U.S. PATENT DOCUMENTS

2006/0257738 A1* 11/2006 Kim .................. H01M 4/133
429/217
2014/0050965 A1* 2/2014 Ha .................... H01M 2/164
429/144

FOREIGN PATENT DOCUMENTS

CN          1768439 A      5/2006

OTHER PUBLICATIONS

Contemporary Amperex Technology Co., Limited, Chinese First Office Action, CN201710203160.X, dated Mar. 30, 2020, 7 pgs.

* cited by examiner

*Primary Examiner* — Wyatt P McConnell
(74) *Attorney, Agent, or Firm* — Morgan, Lewis & Bockius LLP

(57) ABSTRACT

The present disclosure provides an anode electrode slurry suspending agent, an anode electrode plate and an energy storage device, the anode electrode slurry suspending agent has a structural formula composed of a main chain containing carbon and a side chain, the side chain comprises a first side chain $R_1$ and a second side chain $R_2$; the first side chain $R_1$ contains $—R_{11}—CONH_2$, the second side chain $R_2$ contains $—(C=O)OR_{21}$ or $—O(C=O)R_{22}$, the anode electrode slurry suspending agent can significantly improve coating speed of the anode electrode slurry and can ensure that there is no drying-cracking phenomenon of the anode electrode film at the same time, thereby improving productivity and quality rate of coating process of the anode electrode plate and in turn significantly improving production capacity of the energy storage device.

11 Claims, 1 Drawing Sheet

(51) Int. Cl.
  *H01M 4/525* (2010.01)
  *C08L 9/02* (2006.01)
  *C08L 33/24* (2006.01)
  *C08L 33/06* (2006.01)
  *H01M 4/505* (2010.01)
  *H01M 4/1391* (2010.01)
  *H01M 4/131* (2010.01)
  *H01M 4/04* (2006.01)
  *H01M 4/66* (2006.01)
  *H01M 4/02* (2006.01)

(52) U.S. Cl.
  CPC ......... *H01M 4/0404* (2013.01); *H01M 4/131* (2013.01); *H01M 4/1391* (2013.01); *H01M 4/505* (2013.01); *H01M 4/525* (2013.01); *H01M 4/622* (2013.01); *H01M 4/625* (2013.01); *C08L 2203/20* (2013.01); *H01M 4/661* (2013.01); *H01M 2004/027* (2013.01); *H01M 2004/028* (2013.01)

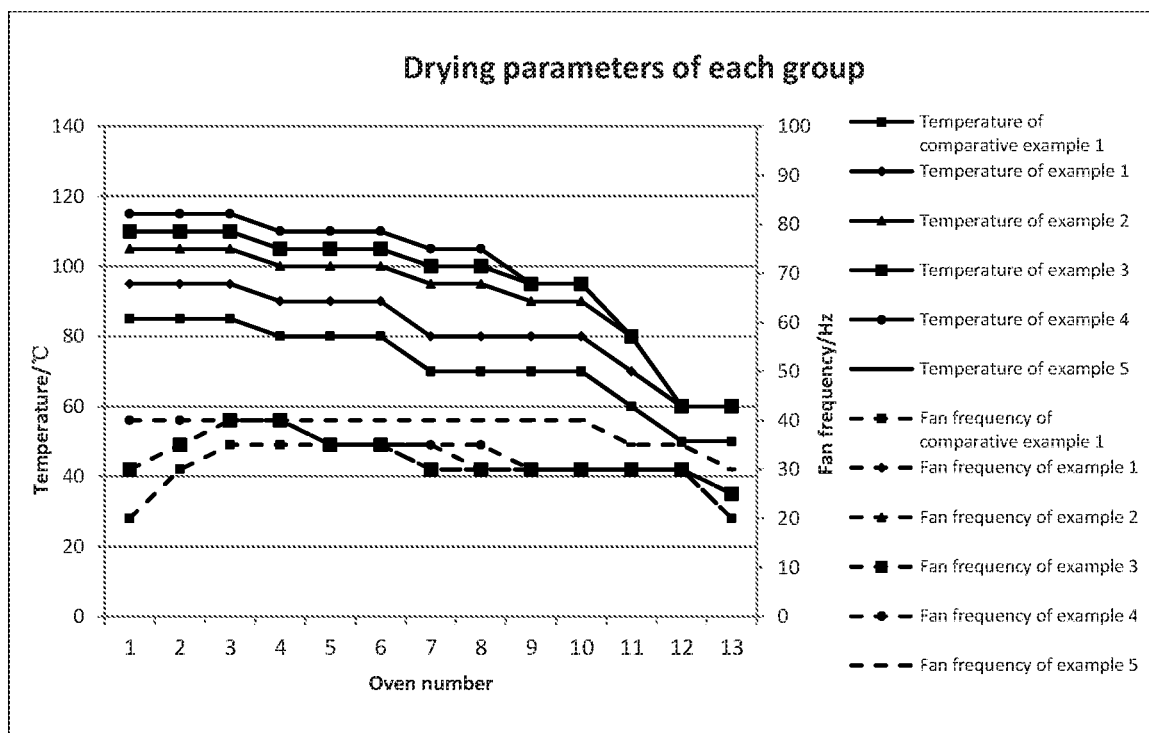

ANODE ELECTRODE SLURRY SUSPENDING AGENT, ANODE ELECTRODE PLATE AND ENERGY STORAGE DEVICE

CROSS-REFERENCE TO RELATED APPLICATIONS

The present application claims priority to Chinese patent application No. CN201710203160.X, filed on Mar. 30, 2017, which is incorporated herein by reference in its entirety.

FIELD OF THE PRESENT DISCLOSURE

The present disclosure relates to the field of energy storage device, and more specifically relates to an anode electrode slurry suspending agent, an anode electrode plate and an energy storage device.

BACKGROUND OF THE PRESENT DISCLOSURE

In recent years, with the enhancement of people's consciousness of energy conservation and environmental protection and the increase of policy support, new energy vehicles representing the future direction of automobile development are gradually becoming the "new love" of consumers. Power battery as a core of the new energy vehicles now naturally arouses the people's "special attention" due to the current concern of new energy vehicles. The rapid growth of demand for new energy vehicles directly affects all aspects of its industrial chain, of which the under-production capacity of power battery is particularly prominent. According to analyses of industry experts, the demand for power batteries exceeded supply is due in a large part to the rapid development of vehicle production in new energy vehicles, which lags behind the response of the entire power battery industry chain. Vehicle plants have been limited production of new energy vehicles because production capacity of power battery is not sufficient. Faced with the produce-sale layout in the new year of new energy vehicles, looking for power battery manufacturers capable of meeting the production capacity needs is a top priority, but for power battery manufacturers, the key is how to increase production capacity.

One way for battery manufacturers to increase production capacity is to increase the speed of each of battery production processes, in which coating is one of the key processes for battery production and the goal thereof is to increase the current speed of 16-20 m/min to 50 m/min or more. However, for the anode electrode slurry, as the coating speed is increased, the phenomenon of drying-cracking of the anode electrode film is more obvious, which affects the appearance and the quality rate of the anode electrode plate, and is even serious, the anode will precipitate lithium and lead to safety problems for the battery. In order to solve problem of the drying-cracking phenomenon of the anode electrode film in rapid coating process of the anode electrode slurry, the lithium battery manufacturers add an appropriate amount of plasticizer in the anode electrode slurry (the content is less than 5 wt %), such as dimethyl sulfite, diethyl sulfite, 1,3-propane sultone, ethylene sulfate, N-methylpyrrolidone, N-methylformamide, N-methylacetamide, N,N-dimethylformamide, γ-butyrolactone, tetrahydrofuran, fluorine-containing cyclic organic esters, sulfur-containing cyclic organic esters, ethylene glycol, etc. Due to the high boiling point of the plasticizer, some of the plasticizer will be remained in the anode electrode film after drying, so as to inhibit the problem of drying-cracking of the anode electrode film in the process of rapid coating of the anode electrode slurry, but there is a risk of corrosion of the oven and the wiring due to the remained plasticizer in the oven during the drying process; the residual of N-methylpyrrolidone will corrode the copper foil; γ-caprolactone, ethylene glycol and the like will be dissolved in the electrolyte to participate side reactions of the electrolyte, thereby deteriorating the performance of the battery.

Therefore, there is a need for a method that can both improve the anode coating performance and improve the battery production capacity without deteriorating the battery performance to meet the development needs of new energy vehicles.

SUMMARY OF THE PRESENT DISCLOSURE

In view of the problems existing in the background, an object of the present disclosure is to provide an anode electrode slurry suspending agent, an anode electrode plate and an energy storage device, the anode electrode slurry suspending agent can significantly improve coating speed of the anode electrode slurry and ensure that there is no drying-cracking phenomenon of the anode electrode film at the same time, thereby improving productivity and quality rate of coating process of the anode electrode plate and in turn significantly improving production capacity of the energy storage device.

In order to achieve the above object, in a first aspect of the present disclosure, the present disclosure provides an anode electrode slurry suspending agent, the anode electrode slurry suspending agent has a structural formula composed of a main chain containing carbon and a side chain, the side chain comprises a first side chain $R_1$ and a second side chain $R_2$; the first side chain $R_1$ contains —$R_{11}$—$CONH_2$, $R_{11}$ is one selected from a group consisting of C1~C5 alkylene group; the second side chain $R_2$ contains —(C=O)$OR_{21}$ or —O(C=O)$R_{22}$, $R_{21}$ and $R_{22}$ each are independently one selected from a group consisting of C4~C8 alkyl group substituted or unsubstituted with one or more substituent group selected from a group consisting of halogen, C4~C8 alkenyl group substituted or unsubstituted with one or more substituent group selected from a group consisting of halogen. C4~C8 alkynyl group substituted or unsubstituted with one or more substituent group selected from a group consisting of halogen, and C4~C8 alkoxy group substituted or unsubstituted with one or more substituent group selected from a group consisting of halogen.

In a second aspect of the present disclosure, the present disclosure provides an anode electrode plate, the anode electrode comprises an anode electrode current collector and an anode electrode film. The anode electrode film provides on the anode electrode current collector and comprises an anode electrode active material. The anode electrode film further comprises a suspending agent, the suspending agent comprises the anode electrode slurry suspending agent according to the first aspect of the present disclosure.

In a third aspect of the present disclosure, the present disclosure provides an energy storage device, the energy storage device comprises the anode electrode plate according to the second aspect of the present disclosure.

Compared to the prior art, the present disclosure has the following beneficial effects: the anode electrode slurry suspending agent of the present disclosure can significantly improve the coating speed of the anode electrode slurry and ensure that there is no drying-cracking phenomenon of the anode electrode film at the same time, thereby improving the productivity and quality rate of coating process of the anode electrode plate and in turn significantly improving the production capacity of the energy storage device.

BRIEF DESCRIPTION OF THE FIGURES

FIG. 1 illustrated drying parameters of examples 1-5 and comparative example 1.

DETAILED DESCRIPTION

Hereinafter an anode electrode slurry suspending agent, an anode electrode plate and an energy storage device according to the present disclosure will be described in detail.

Firstly, an anode electrode slurry suspending agent according to a first aspect of the present disclosure will be described.

The anode electrode slurry suspending agent according to the first aspect of the present disclosure has a structural formula composed of a main chain containing carbon and a side chain. The side chain comprises a first side chain $R_1$ and a second side chain $R_2$. The first side chain $R_1$ contains —$R_{11}$—$CONH_2$, $R_{11}$ is one selected from a group consisting of C1~C5 alkylene group. The second side chain $R_2$ containing —(C=O)$OR_{21}$ or —O(C=O)$R_{22}$, $R_{21}$ and $R_{22}$ each being independently one selected from a group consisting of C4~C8 alkyl group substituted or unsubstituted with one or more substituent group selected from a group consisting of halogen, C4~C8 alkenyl group substituted or unsubstituted with one or more substituent group selected from a group consisting of halogen, C4~C8 alkynyl group substituted or unsubstituted with one or more substituent group selected from a group consisting of halogen, and C4~C8 alkoxy group substituted or unsubstituted with one or more substituent group selected from a group consisting of halogen.

In the anode electrode slurry suspending agent according to the first aspect of the present disclosure, conventional anode electrode slurry suspending agent (such as carboxymethyl cellulose sodium, etc.) generally has strong polarity and poor flexibility, so coating speed will be slow and drying-cracking phenomenon will appear on the anode electrode film during the coating and drying process of the anode electrode slurry, thereby seriously affect the productivity and quality rate of the anode electrode plate. Hydrophilic functional group —$CONH_2$, which is contained in the first side chain $R_1$ of the anode electrode slurry suspending agent in the present disclosure, can bond with water molecule, so as to increase molecular volume of the anode electrode slurry suspending agent, and in turn increase the steric hindrance, thereby allowing the anode electrode slurry suspending agent to have more stable suspension ability, that is individual powder particles in the anode electrode slurry can maintain a uniform distance during the high-speed stirring, the powders in anode electrode slurry can be uniformly dispersed without settling, so that the coating speed of the anode electrode slurry can be significantly improved, thereby improving coating performance of the anode electrode plate; —(C=O)$OR_{21}$ or —O(C=O)$R_{22}$, which is contained in the second side chain $R_2$ of the anode electrode slurry suspending agent in the present disclosure, makes the second side chain $R_2$ become a flexible side chain, its good flexibility may be appropriate to reduce acting force between molecules, which may play a role of increasing plasticization inside the anode electrode slurry during the coating and drying process of the anode electrode slurry, thereby avoiding drying-cracking phenomenon of the anode electrode film during the coating and drying process of the anode electrode slurry.

In the anode electrode slurry suspending agent according to the first aspect of the present disclosure, the substituted group may be one or more selected from a group consisting of F, Cl, Br and I. Preferably, the substituted group may be one or more selected from a group consisting of F, Cl and Br. Further preferably, the substituted group may be one or more selected from a croup consisting of F and Br. More preferably, the substituted group is selected from F.

In the anode electrode slurry suspending agent according to the first aspect of the present disclosure, a number-average molecular weight of the anode electrode slurry suspending agent may range from 300,000 to 400,000. If the number-average molecular weight is too high, the anode electrode slurry suspending agent is difficult to dissolve in the solvent (such as deionized water as usual) during the stirring process of the slurry, and even if dissolved, the viscosity will be too large to uniformly disperse the anode electrode active material particles, the conductive agent particles, and the particles are easily aggregated; if the number-average molecular weight is too low, the suspension ability with respect to the anode electrode active material particles and the conductive agent particles is insufficient, the anode electrode slurry settling easily occurs.

In the anode electrode slurry suspending agent according to the first aspect of the present disclosure, the structural formula of the anode electrode slurry suspending agent can be represented by formula 1, in formula 1, a:b=(40~50):(50~60).

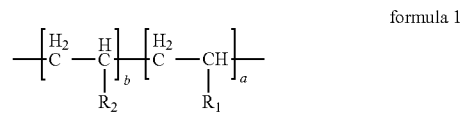

formula 1

In the anode electrode slurry suspending agent according to the first aspect of the present disclosure, the main chain containing carbon of the anode electrode slurry suspending agent may further has carbon-carbon double bond. The anode electrode slurry suspending agent may be crosslinked during the coating and drying process of the anode electrode slurry due to the existence of the carbon-carbon double bond, and its crosslinking degree is generally more than 40%, thereby improving cohesion of the anode electrode film, reducing infiltration of electrolyte on the anode electrode plate, that is, reducing dissolubility of anode electrode film in the electrolyte the increased cohesion of the anode electrode film also may reduce volume rebound (that is, volume expansion) of the anode electrode plate during cycle process at the same time.

In the anode electrode slurry suspending agent according to the first aspect of the present disclosure, when the main chain containing carbon of the anode electrode slurry suspending agent has carbon-carbon double bond, the structural formula of the anode electrode slurry suspending agent can be represented by formula 2, in formula 2, a:b:c=(45~55):(45~55):(1~10), $R_4$ and $R_5$ each are independently one selected from a group consisting of H, F, C1~C5 alkyl group and C1~C5 fluoroalkyl group.

formula 2

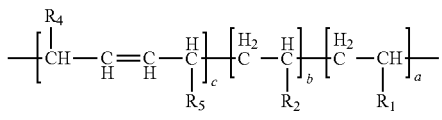

In the anode electrode slurry suspending agent according to the first aspect of the present disclosure, the side chain of the anode electrode slurry suspending agent may further comprises a third side chain $R_3$, the third side chain $R_3$ contains polar functional group, the polar functional group may be one or more selected from a group consisting of nitrite group, sulfonic group, carboxyl, phenolic hydroxyl group, alcoholic hydroxyl group, amino group, —(C=O)NH— and —(C=O)N—. The polar functional group of the third side chain $R_3$ may improve bond force between the anode electrode active material particles, bond force between the anode electrode active material particles and the conductive agent, bond force between the anode electrode active material particles and the anode electrode current collector and bond force between the conductive agent and the anode electrode current collector to improve structural stability of the anode electrode slurry during coating and drying process and cycle process, thus further reduce the risk of drying-cracking phenomenon of the anode electrode film.

In the anode electrode slurry suspending agent according to the first aspect of the present disclosure, when the side chain of the anode electrode slurry suspending agent further comprises the third side chain $R_3$, the structural formula of the anode electrode slurry suspending agent can be represented by formula 3, in formula 3, a:b:d=(45~55):(45~55):(1~10), $R_3$ is one selected from a group consisting of —CN, —CH$_2$CN, —CH$_2$CH$_2$CN, —OCN, —CH$_2$NH$_2$, —CONHCH$_3$, —CON(CH$_3$)$_2$, —OH, —CH$_2$OH, —C(CH$_3$)$_2$OH, —COOH, —C$_6$H$_5$COOH, —SO$_3$H, —CH$_2$SO$_3$H, —C$_6$H$_5$SO$_3$H and C$_6$H$_5$CH$_2$SO$_3$H.

formula 3

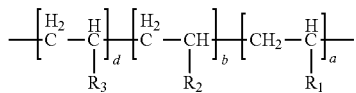

In the anode electrode slurry suspending agent according to the first aspect of the present disclosure, in the structural formula of the anode electrode slurry suspending agent, the main chain containing carbon has the carbon-carbon double bond, and the side chain further comprises the third side chain $R_3$ at the same time, the third side chain $R_3$ contains a polar functional group, the polar functional group may be one or more selected from a group consisting of nitrile group, sulfonic group, carboxyl, phenolic hydroxyl group, alcoholic hydroxyl group, amino group, —(C=O)NH— and —(C=O)N—. The structural formula of the anode electrode slurry suspending agent can be represented by formula 4, in formula 4, a:b:c:d=(40~50):(40~50):(1~10):(1~10), $R_4$ and $R_5$ each are independently one selected from a group consisting of H, F, C1~C5 alkyl group and C1~C5 fluoroalkyl group, $R_3$ may be one selected from a group consisting of —CN, —CH$_2$CN, —CH$_2$CH$_2$CN, —OCN, —CH$_2$NH$_2$, —CONHCH$_3$, —CON(CH$_3$)$_2$, —OH, —CH$_2$OH, —C(CH$_3$)$_2$OH, —COOH, —C$_6$H$_5$COOH, —SO$_3$H, —CH$_2$SO$_3$H, —C$_6$H$_5$SO$_3$H and —C$_6$H$_5$CH$_2$SO$_3$H.

formula 4

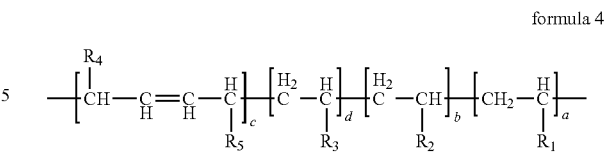

In the anode electrode slurry suspending agent according to the first aspect of the present disclosure, specifically, the structural formula of the anode electrode slurry suspending agent may be one selected from a group consisting of following formulas where, in formula 5, a:b=(40~50):(50~60); in formula 6, a:b:c=(45~55):(45~55):(1~10); in formula 7 a:b:d=(45~55):(45~55):(1~10), in formula 8 to formula 12, a:b:c:d=(40~50):(40~50):(1~10):(1~10);

formula 5

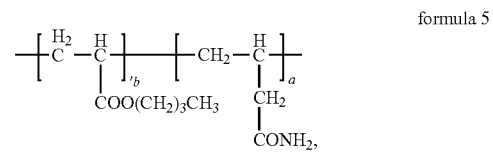

formula 6

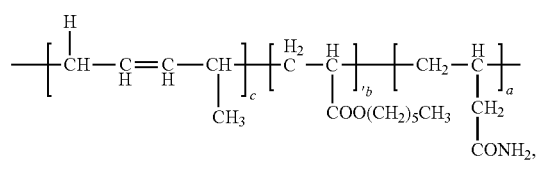

formula 7

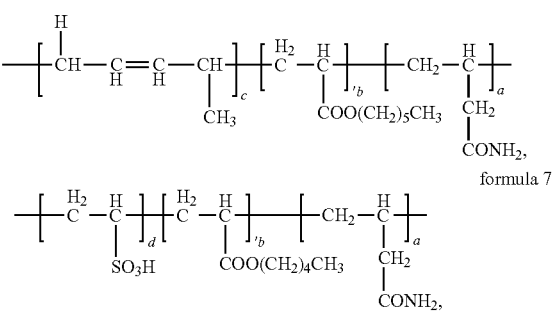

formula 8

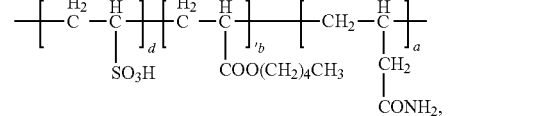

formula 9

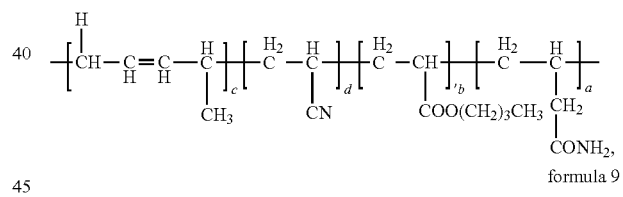

formula 10

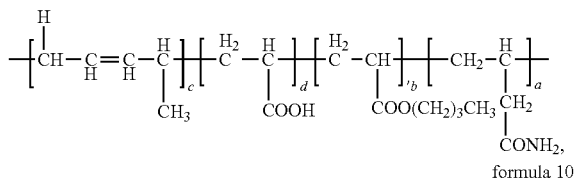

formula 11

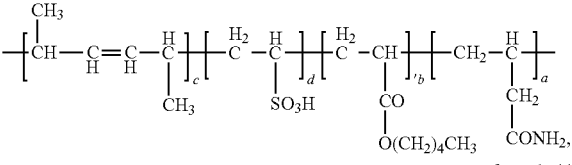

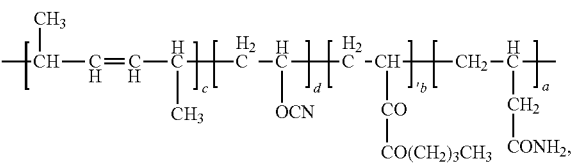

-continued formula 12

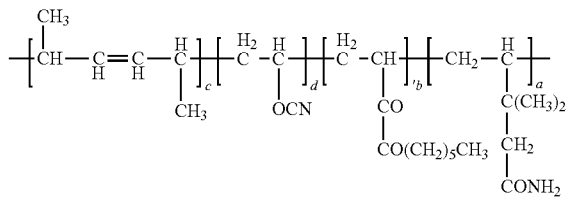

Secondly, an anode electrode plate according to a second aspect of the present disclosure will be described.

The anode electrode plate according to the second aspect of the present disclosure comprises an anode electrode current collector and an anode electrode film. The anode electrode film is provided on the anode electrode current collector and comprises an anode electrode active material. The anode electrode film further comprises a suspending agent. The suspending agent comprises the anode electrode slurry suspending agent according to the first aspect of the present disclosure.

In the anode electrode plate according to the second aspect of the present disclosure, a weight percentage of the suspending agent in the anode electrode film can be 1% to 2%, it may ensure that the anode electrode slurry has stable suspension ability and the coating speed can be increased to 50 m/min or above at the same time, so as to meet the requirements of industry on coating of the anode electrode slurry.

In the anode electrode plate according to the second aspect of the present disclosure, the suspending agent may further comprise carboxymethylcellulose sodium in addition to the anode electrode slurry suspending agent according to the first aspect of the present disclosure, where a number-average molecular weight of the carboxymethylcellulose sodium ranges from 300,000~400,000. In this case, the content of the anode electrode slurry suspending agent may be appropriately decreased and the coating speed of the anode electrode slurry can be significantly improved at the same time. For example, when the weight percentage of the anode electrode slurry suspending agent according to the first aspect of the present disclosure is less than 1% and 1% carboxymethylcellulose sodium is added, the coating speed of the anode electrode slurry still can be increased to 25 m/min~30 m/min, the drying-cracking phenomenon of the anode electrode film may also be improved to a certain extent at the same time.

Thirdly, an energy storage device according to a third aspect of the present disclosure will be described.

The energy storage device according to the third aspect of the present disclosure comprises the anode electrode plate according to the third aspect of the present disclosure.

In the energy storage device according to the third aspect of the present disclosure, the energy storage device further comprises a cathode electrode plate, a separator and an electrolyte, and etc.

In the energy storage device according to the third aspect of the present disclosure, it should be noted that, the energy storage device may be a supercapacitor, a lithium-ion battery, sodium-ion battery, etc. In examples of the present disclosure, the illustrated energy storage device is lithium-ion battery, but the present disclosure is not limited to that.

In the lithium-ion battery, the cathode electrode plate comprises a cathode electrode current collector and a cathode electrode film provided on the cathode electrode current collector. The cathode electrode current collector is an aluminum foil.

In the lithium-ion battery, a cathode electrode active material selected from a group consisting of lithium transition metal oxide, specifically, the cathode electrode active material may be one or more selected from a group consisting of lithium cobalt oxide, lithium nickel oxide, lithium manganese oxide, lithium nickel manganese oxide, lithium nickel cobalt manganese oxide, lithium nickel cobalt aluminum oxide and compounds thereof obtained by adding other transition metals or non-transition metals to the above oxides, preferably, the cathode electrode active material may be one or more selected from a group consisting of lithium cobalt oxide ($LiCoO_2$), lithium manganese dioxide, lithium iron phosphate and nickel cobalt manganese metal oxide (NCM). The cathode electrode conductive agent may be one or more selected from a group consisting of acetylene black, conductive carbon black (Super P, Super S, 350G, etc.), carbon fibre (VGCF), carbon nanotube (CNT) and ketjenblack.

In the lithium-ion battery, the anode electrode current collector may be a copper foil.

In the lithium-ion battery, the anode electrode active material may selected from a group consisting of materials which are able to intercalate and deintercalate lithium, specifically, the anode electrode active material may be one or more selected from a group consisting of soft carbon, hard carbon, artificial graphite, natural graphite, silicon, silicon oxide compound, silicon carbon composite, lithium titanium oxide and metal that can form an alloy with lithium the anode conductive agent may be one or more selected from a group consisting of acetylene black, conductive carbon black (Super P, Super S, 350G), carbon fibre (VGCF), carbon nanotube (CNT) and ketjenblack.

In the lithium-ion battery, the electrolyte may be liquid electrolyte, the electrolyte may comprises a lithium salt and an organic solvent.

In the lithium-ion battery, a specific type of the lithium salt is not specifically limited. Specifically, the lithium salt may be one or more selected from a group consisting of $LiPF_6$, $LiBF_4$, $LiN(SO_2F)_2$ (abbreviated as LiFSI), $LiN(CF_3SO_2)_2$ (abbreviated as LiTFSI), $LiClO_4$, $LiAsF_6$, $LiB(C_2O_4)_2$ (abbreviated as LiBOB) and $LiBF_2C_2O_4$ (abbreviated as LiDFOB).

In the lithium-ion battery, a specific type of the organic solvent is not specifically limited and may be changed as desired, preferably, the organic solvent is non-aqueous organic solvent. The non-aqueous organic solvent may comprises any kind of carbonate and/or carboxylate. The carbonate may comprise cyclic carbonate ester or chain carbonate ester. The non-aqueous organic solvent may further comprise halogenated carbonate ester. Specifically, the organic solvent may be one or more selected from a group consisting of ethylene carbonate (EC), propylene carbonate (PC), butylene carbonate, pentylene carbonate, fluoroethylene carbonate, dimethyl carbonate, diethyl carbonate (DEC), dipropyl carbonate, ethyl methyl carbonate, γ-butyrolactone, methyl formate, ethyl formate, ethyl propionate, propyl propionate and tetrahydrofuran.

Hereinafter the present disclosure will be described in detail in combination with examples. It should be noted that, the examples described in the present disclosure are only used for explaining the present disclosure, and are not intended to limit the present disclosure. In the examples, the described energy storage device is a lithium-ion secondary battery, but the present disclosure is not limited to that.

In the following example, the reagents, materials and instruments used are commercially available unless otherwise specified.

In example and comparative example, the anode electrode slurry suspending agent can be prepared as follows.

Synthesis method of the anode electrode slurry suspending agent in formula 5 was as follows:

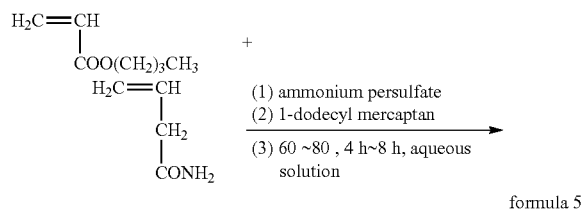

formula 5 where, ammonium persulfate is initiator, 1-dodecyl mercaptan is molecular weight regulator.

Synthesis method of the anode electrode slurry suspending agent in formula 6 was as follows:

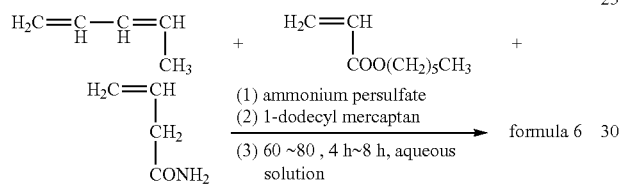

formula 6 where, ammonium persulfate is initiator, 1-dodecyl mercaptan is molecular weight regulator.

Synthesis method of the anode electrode slurry suspending agent in formula 7 was as follows:

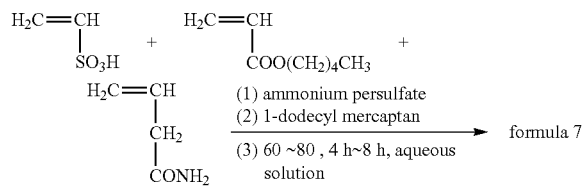

formula 7 where, ammonium persulfate is initiator, 1-dodecyl mercaptan is molecular weight regulator.

Synthesis method of the anode electrode slurry suspending agent in formula 8 was as follows:

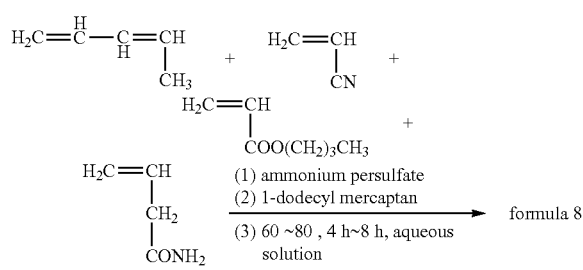

formula 8 where, ammonium persulfate is initiator, 1-dodecyl mercaptan is molecular weight regulator.

Synthesis method of the anode electrode slurry suspending agent from formula 9 to formula 12 was similar to the synthesis method of formula 5 to formula 8, and only need to change the raw materials (such as to change the reaction substrate, etc.). Specific synthesis method can also refer to following literature:

1. U.S. Pat. No. 4,788,278 issued on Nov. 29, 1988;
2. U.S. Pat. No. 3,607,851 issued on Sep. 21, 1971.

The water content of the anode electrode slurry suspending agent in formula 5 to formula 12 was respectively measured by a weight-loss method, and the viscosity of aqueous solution with 1.5% concentration is measured by a viscometer, the pH value was measured by an acidometer, the purity was measured by a gas chromatography-mass spectrometry (GC-MS) method, maximum particle size was measured by a particle size tester, where the anode electrode slurry suspending agent which useful for the energy storage device needed to meet the requirement that the water content was less than 7%, the viscosity was 3,200 mPa·s~20,000 mPa·s of the aqueous solution with 1.5% concentration, the pH value was 6.0~8.0, the maximum particle size was less than or equal to 40 µm. The characterization results of the anode electrode slurry suspending agent in formula 5 to formula 12 were shown in table 1.

TABLE 1

Characterization results of the anode electrode slurry suspending agent in formula 5 to formula 12

| | Water content (%) | Viscosity of aqueous solution with 1.5% concentration (mPa · s) | pH | Purity (%) | Maximum particle size (µm) |
|---|---|---|---|---|---|
| Formula 5 | 4.2 | 14580 | 6.7 | 99.8 | 35 |
| Formula 6 | 4.2 | 14650 | 6.8 | 99.9 | 33 |
| Formula 7 | 5.7 | 14640 | 6.8 | 99.9 | 38 |
| Formula 8 | 4.4 | 15200 | 6.8 | 99.8 | 38 |
| Formula 9 | 5.5 | 14300 | 6.8 | 99.8 | 34 |
| Formula 10 | 4.9 | 15400 | 6.8 | 99.8 | 35 |
| Formula 11 | 4.5 | 14540 | 6.7 | 99.9 | 31 |
| Formula 12 | 5.5 | 16380 | 6.7 | 99.9 | 32 |

Hereinafter preparation process of lithium-ion battery would be described.

Example 1

(1) Preparation of a cathode electrode plate: $LiN_{1/3}Mn_{1/3}Co_{1/3}O_2$ (cathode electrode active material), acetylene black (conductive agent) and PVDF (binder) according to a weight ratio 94:3:3 were fully stirred and uniformly mixed with N-methyl-2-pyrrolidone, then was coated on an aluminum foil (cathode electrode current collector), after drying and cold pressing, the cathode electrode plate was obtained.

(2) Preparation of an anode electrode plate: artificial graphite (anode electrode active material), acetylene black (conductive agent), SBR (binder) and anode electrode slurry suspending agent in formula 5 according to a weight ratio 95:2:2:1 were fully stirred and uniformly mixed with deionized water, then was coated on copper foil (anode electrode current collector), after drying and cold pressing, the anode electrode plate was obtained, where the number-average molecular weight of the anode electrode slurry suspending agent in formula 5 was 300,000~400,000.

(3) Preparation of a electrolyte: in an argon atmosphere glove box in which the water content was less than 10 ppm, EC, PC, DEC according to a volume ratio EC:PC:DEC=1:1:1 were mixed as an organic solvent, then fully dried lithium salt $LiPF_6$ was dissolved into the mixed organic solvent, the electrolyte was obtained after uniformly mixed.

(4) Preparation of separator: a PE porous film was used as the separator.

(5) Preparation of the lithium-ion battery: the cathode electrode plate, the separator, the anode electrode plate were laminated in order so as to make the separator separate the cathode plate from the anode electrode plate, then were wound to form an electrode assembly and placed in a package case, next the prepared electrolyte was injected into the dried electrode assembly, after vacuum packaging, standing-by, forming, shaping, the lithium-ion battery was obtained.

Example 2

The preparation was the same as example 1, except that in the preparation of the anode electrode plate (step (2)), the structural formula of the anode electrode slurry suspending agent was represented by formula 6, the number-average molecular weight ranged from 300,000 to 400,000.

Example 3

The preparation was the same as example 1, except that in the preparation of the anode electrode plate (step (2)), the structural formula of the anode electrode slurry suspending agent was represented by formula 7, the number-average molecular weight ranged from 300,000 to 400,000.

Example 4

The preparation was the same as example 1, except that in the preparation of the anode electrode plate (step (2)), the structural formula of the anode electrode slurry suspending agent was represented by formula 8, the number-average molecular weight ranged from 300,000 to 400,000.

Example 5

The preparation was the same as example 1, except that in the preparation of the anode electrode plate (step (2)), the structural formula of the anode electrode slurry suspending agent was represented by formula 9, the number-average molecular weight ranged from 300,000 to 400,000.

Example 6

The preparation was the same as example 1, except that in the preparation of the anode electrode plate (step (2)), the structural formula of the anode electrode slurry suspending agent is represented by formula 10, the number-average molecular weight ranged from 300,000 to 400,000.

Example 7

The preparation was the same as example 1, except that in the preparation of the anode electrode plate (step (2)), the structural formula of the anode electrode slurry suspending agent was represented by formula 11, the number-average molecular weight ranged from 300,000 to 400,000.

Example 8

The preparation was the same as example 1, except that in the preparation of the anode electrode plate (step (2)), the structural formula anode electrode slurry suspending agent was represented by formula 12, the number-average molecular weight ranged from 300,000 to 400,000.

Comparative Example 1

The preparation was the same as example 1, except that in the preparation of the anode electrode plate (step (2)), the anode electrode slurry suspending agent was selected from carboxymethylcellulose sodium, the number-average molecular weight ranged from 300,000 to 400,000.

Finally drying performance test processes of the anode electrode film of the lithium-ion battery were described.

In the preparation of the anode electrode plate, an extrusion coating machine with an oven which was 36 m in length was used to dry the anode electrode current collector copper foil coating with the anode electrode slurry, the anode electrode plate provided with dried anode electrode film on its surface was obtained, where the coating amount ranged from 9 $mg/cm^2$ to 15 $mg/cm^2$; temperature and fan frequency of drying of each group were set according to coating speed, where, drying parameters of the example 1-5 and comparative example 1 were shown in FIG. 1.

TABLE 2

Test results of examples 1-8 and comparative example 1

| | 15 m/min | 20 m/min | 30 m/min | 40 m/min | 50 m/min |
|---|---|---|---|---|---|
| Example 1 | no crack | no crack | no crack | no crack | no crack |
| Example 2 | no crack | no crack | no crack | no crack | no crack |
| Example 3 | no crack | no crack | no crack | no crack | no crack |
| Example 4 | no crack | no crack | no crack | no crack | no crack |
| Example 5 | no crack | no crack | no crack | no crack | no crack |
| Example 6 | no crack | no crack | no crack | no crack | no crack |
| Example 7 | no crack | no crack | no crack | no crack | no crack |
| Example 8 | no crack | no crack | no crack | no crack | no crack |
| Comparative example 1 | no crack | slight crack | serious crack | serious crack | serious crack |

It could be seen from Table 2, in examples 1-8, after the anode electrode slurry suspending agent of the present disclosure was added into the anode electrode slurry, the coating performance of the anode electrode plate could be significantly improved, when coating speed of the anode electrode slurry reached to 50 m/min, there were no crack on the anode electrode film after drying, thereby significantly improving production capacity of the lithium-ion battery. In comparative example 1, conventional carboxymethylcellulose sodium (CMC) was used as suspending agent, when the coating speed of the anode electrode slurry was 20 m/min, slight crack appeared on the anode electrode film during the drying process, if the coating speed was further increased, drying-cracking phenomenon of the anode electrode film would be more obvious, thereby seriously affecting the normal use of the anode electrode plate and reducing the production capacity of the lithium-ion battery.

What is claimed:

1. An anode electrode slurry suspending agent, having a structural formula composed of a main chain containing carbon and a side chain, the side chain comprising a first side chain $R_1$ and a second side chain $R_2$;

the first side chain $R_1$ containing —$R_{11}$—$CONH_2$, $R_{11}$ being one selected from the group consisting of C1-C5 alkylene groups;

the second side chain $R_2$ containing —(C=O)$OR_{21}$ or —O(C=O)$R_{22}$, $R_{21}$ and $R_{22}$ each being independently one selected from the group consisting of unsubstituted C4-C8 alkyl groups and substituted C4-C8 alkyl groups, where the substituted C4-C8 alkyl groups are substituted with at least one substituent group selected from the group consisting of halogen, unsubstituted C4-C8 alkenyl groups and substituted C4-C8 alkenyl groups, where the substituted C4-C8 alkenyl groups are substituted with at least one substituent group selected from the group consisting of halogen, unsubstituted C4-C8 alkynyl groups and substituted C4-C8 alkynyl groups, where the substituted C4-C8 alkynyl groups are substituted with at least one substituent group selected from the group consisting of halogen, and unsubstituted C4-C8 alkoxy groups and substituted C4-C8 alkoxy groups, where the substituted C4-C8 alkoxy groups are substituted with at least one substituent group selected from the group consisting of halogen;

wherein a number-average molecular weight of the anode electrode slurry suspending agent ranges from 300,000 to 400,000.

2. The anode electrode slurry suspending agent according to claim 1, wherein the structural formula of the anode electrode slurry suspending agent is as follows:

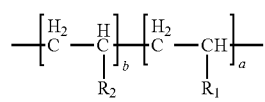

formula 1 in formula 1, a:b=(40~50):(50~60).

3. The anode electrode slurry suspending agent according to claim 1, wherein the main chain containing carbon has carbon-carbon double bond; and/or
the side chain further comprises a third side chain $R_3$, the third side chain $R_3$ contains polar functional group, the polar functional group is one or more selected from a group consisting of nitrile group, sulfonic group, carboxyl, phenolic hydroxyl group, alcoholic hydroxyl group, amino group, —(C=O)NH— and —(C=O)N—.

4. The anode electrode slurry suspending agent according to claim 2, wherein the structural formula of the anode electrode slurry suspending agent is

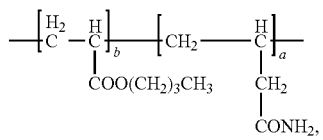

formula 5 where,
in formula 5, a:b=(40~50):(50~60).

5. An anode electrode plate, comprising:
an anode electrode current collector; and
an anode electrode film provided on the anode electrode current collector and comprising an anode electrode active material;
the anode electrode film further comprising a suspending agent, the suspending agent comprising an anode electrode slurry suspending agent, the anode electrode slurry suspending agent having a structural formula composed of a main chain containing carbon and a side chain, the side chain comprising a first side chain $R_1$ and a second side chain $R_2$;

the first side chain $R_1$ containing —$R_{11}$—CONH$_2$, $R_{11}$ being one selected from a group consisting of C1-C5 alkylene group;
the second side chain $R_2$ containing —(C=O)OR$_{21}$ or —O(C=O)R$_{22}$, $R_{21}$ and $R_{22}$ each being independently one selected from the group consisting of unsubstituted C4-C8 alkyl groups and substituted C4-C8 alkyl groups, where the substituted C4-C8 alkyl groups are substituted with at least one substituent group selected from the group consisting of halogen, unsubstituted C4-C8 alkenyl groups and substituted C4-C8 alkenyl groups, where the substituted C4-C8 alkenyl groups are substituted with at least one substituent group selected from the group consisting of halogen, unsubstituted C4-C8 alkynyl groups and substituted C4-C8 alkynyl groups, where the substituted C4-C8 alkynyl groups are substituted with one or more at least one substituent group selected from the group consisting of halogen, and unsubstituted C4-C8 alkoxy groups and substituted C4-C8 alkoxy groups, where the substituted C4-C8 alkoxy groups are substituted with at least one substituent group selected from the group consisting of halogen;

wherein a number-average molecular weight of the anode electrode slurry suspending agent ranges from 300,000 to 400,000.

6. The anode electrode plate according to claim 5, wherein the structural formula of the anode electrode slurry suspending agent is as follows:

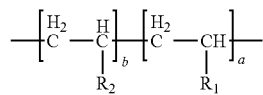

formula 1 in formula 1, a:b=(40~50):(50~60).

7. The anode electrode plate according to claim 5, wherein the main chain containing carbon has carbon-carbon double bond; and/or
the side chain further comprises a third side chain $R_3$, the third side chain $R_3$ contains polar functional group, the polar functional group is one or more selected from a group consisting of nitrile group, sulfonic group, carboxyl, phenolic hydroxyl group, alcoholic hydroxyl group, amino group, —(C=O)NH— and —(C=O)N—.

8. The anode electrode plate according to claim 6, wherein the structural formula of the anode electrode slurry suspending agent is

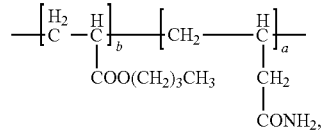

formula 5 where,
in formula 5, a:b=(40~50):(50~60).

9. An energy storage device, comprising an anode electrode plate,
the anode electrode plate comprising:
an anode electrode current collector; and
an anode electrode film provided on the anode electrode current collector and comprising an anode electrode active material;

the anode electrode film further comprising a suspending agent, the suspending agent comprising an anode electrode slurry suspending agent, the anode electrode slurry suspending agent having a structural formula composed of a main chain containing carbon and a side chain, the side chain comprising a first side chain $R_1$ and a second side chain $R_2$;

the first side chain $R_1$ containing —$R_{11}$—$CONH_2$, $R_{11}$ being one selected from a group consisting of C1-C5 alkylene group;

the second side chain $R_2$ containing —(C=O)$OR_{21}$ or —O(C=O)$R_{22}$, $R_{21}$ and $R_{22}$ each being independently one selected from the group consisting of unsubstituted C4-C8 alkyl groups and substituted C4-C8 alkyl groups, where the substituted C4-C8 alkyl groups are substituted with at least one substituent group selected from the group consisting of halogen, unsubstituted C4-C8 alkenyl groups and substituted C4-C8 alkenyl groups, where the substituted C4-C8 alkenyl groups are substituted with at least one substituent group selected from the group consisting of halogen, unsubstituted C4-C8 alkynyl groups and substituted C4-C8 alkynyl groups, where the substituted C4-C8 alkynyl groups are substituted with at least one substituent group selected from the group consisting of halogen, and unsubstituted C4-C8 alkoxy groups and substituted C4-C8 alkoxy groups, where the substituted C4-C8 alkoxy groups are substituted with at least one substituent group selected from the group consisting of halogen;

wherein a number-average molecular weight of the anode electrode slurry suspending agent ranges from 300,000 to 400,000.

10. The energy storage device according to claim 9, wherein the structural formula of the anode electrode slurry suspending agent is as follows:

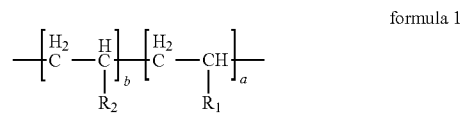

formula 1 in formula 1, a:b=(40~50):(50~60).

11. The energy storage device according to claim 9,
wherein the main chain containing carbon has carbon-carbon double bond; and/or
the side chain further comprises a third side chain $R_3$, the third side chain $R_3$ contains polar functional group, the polar functional group is one or more selected from a group consisting of nitrile group, sulfonic group, carboxyl, phenolic hydroxyl group, alcoholic hydroxyl group, amino group, —(C=O)NH— and —(C=O)N—.

* * * * *